(12) United States Patent
Miyata et al.

(10) Patent No.: US 7,160,499 B2
(45) Date of Patent: *Jan. 9, 2007

(54) METHOD FOR MAKING INFLATION FILMS

(75) Inventors: Takahiro Miyata, Okayama (JP);
Katsunori Hatashi, Kitakanbara-gun (JP); Tatsuya Sunamoto, Kurashiki (JP); Tadao Yoshikawa, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 325 days.

This patent is subject to a terminal disclaimer.

(21) Appl. No.: 10/650,847

(22) Filed: Aug. 29, 2003

(65) Prior Publication Data
US 2004/0094877 A1    May 20, 2004

(30) Foreign Application Priority Data
Aug. 30, 2002    (JP)    ............... 2002-254087

(51) Int. Cl.
B29D 22/00    (2006.01)
(52) U.S. Cl. ........................ 264/564; 264/573
(58) Field of Classification Search ............... 264/564, 264/573
See application file for complete search history.

(56) References Cited

U.S. PATENT DOCUMENTS 4,330,501 A * 5/1982 Jones et al. ............... 264/566
5,468,444 A * 11/1995 Yazaki et al. ............... 264/566
5,525,277 A * 6/1996 Joseph ....................... 264/40.6

FOREIGN PATENT DOCUMENTS

| JP | 9-109274 | 4/1997 |
| JP | 10-29243 | 2/1998 |
| JP | 2001-239583 | 9/2001 |

OTHER PUBLICATIONS

U.S. Appl. No. 10/843,308, filed May 12, 2004, Yoshikawa, et al.
U.S. Appl. No. 10/650,847, filed Aug. 29, 2003, Miyata, et al.

* cited by examiner

Primary Examiner—Suzanne E. McDowell
(74) Attorney, Agent, or Firm—Oblon, Spivak, McClelland, Maier & Neustadt, P.C.

(57) ABSTRACT

An inflation film is formed by extruding a raw resin in a molten state through a circular die to form a tubular film, expanding the tubular film by the pressure of a gaseous medium introduced into an inner space of the tubular film, while the tubular film is being cooled to be solidified by blowing a cooling gas to the outer surface of the tubular film, and drawing the film while being progressively flattened by guide members. During the manufacture, the temperature Tf (° C.) of the solidified tubular film at the time it contacts the guide member for the first time is so adjusted as not to be higher than Tr (5) [° C.]; wherein Tr (5) represents the temperature at which the thermal deformation ratio of the solidified tubular film becomes 5% when it is measured, being loaded with a stress of a value equal to the frictional force received from the guide members under the conditions of manufacture of the film.

6 Claims, 3 Drawing Sheets

METHOD FOR MAKING INFLATION FILMS

RELATED APPLICATIONS

This application is based on the Japanese Patent Application No. 2001-254087 filed on Aug. 30, 2002, the entire contents of which are hereby incorporated by reference.

BACKGROUND OF THE INVENTION

1. Field of the Invention

The present invention relates to a method for making an inflation film.

2. Description of the Related Art

The inflation molding technique has been widely employed in the manufacture of films made of a thermoplastic resin such as a polyolefin including a low density polyethylene and a high density polyethylene and so on, because an apparatus for conducting the inflation molding is simple and inexpensive.

FIG. 1 schematically illustrates a conventional apparatus for making a film by inflation molding. According to this apparatus, a molten thermoplastic resin is extruded through a circular die 2 of an extruder, and the extruded tubular film 4 is drawn while being cooled, while, at the same time, a gaseous medium such as air is introduced into an inner space of the tubular film so that the tubular film can be expanded to a predetermined size by the effect of the pressure of the gaseous medium. The tubular film 4 is solidified to have a final diameter and is then guided by a pair of guide members 11, constructed of flat plates arranged in a V-shape so as to guide the opposing surfaces of the tubular film to be close to each other, so that the tubular film 4 is progressively flattened. Then, the film is passed through a pair of nipping rolls to give a folded sheet, that is, a folded tubular film.

Thereafter, the folded sheet may be converted into two separate flat films with the lug of the folded sheet cut off by a slitter. The folded tubular film or the resulting flat films are then wound up around a take-up roll or reel.

With respect to the inflation molding, various attempts have been made. For example, the Japanese Patent Application Laid-open No. Hei. 9-109274 (JPA 9-109274) discloses a water quenching inflation molding in which the outer surface of the tubular film expanded to a predetermined size is rapidly cooled by water. According to this method, by adjusting the cooling speed of the tubular film, the temperature of the inner surface of the tubular film is maintained so high that the opposite portions of the inner surfaces of the tubular film are fused together as it passes through a pair of nipping rolls.

JPA 9-109274 describes that the method disclosed therein is advantageous in that the formed film can be drawn at a high speed because the blocking of the film is suppressed. In addition, the water quenching inflation molding technique generally provides a highly transparent film by a rapid cooling process.

Japanese Patent Application Laid-open No. 2001-239583 (JPA 2001-239583) discloses a method for making a highly transparent inflation film at a high speed and with good stability. According to this method, the inflation molding is so carried out as to satisfy the following conditions:

$a \times b \geq 1600$ and $a \times e \geq 720$ wherein "a" represents the thickness of the film to be molded in terms of µm, "b" represents the molding speed at which the film is molded in terms of meter per minute, and "c" represents the peak value of the cooling speed at which a molten resin is cooled in term of ° C. per second.

Japanese Patent Application Laid-open No. Hei. 10-29243 (JPA 10-29243) discloses a method for making a film by an air quenching inflation molding characterized in that an aromatic crystalline thermoplastic resin having a melt flow rate of 3 to 8 is extruded downwardly from a circular die, the temperature of which is adjusted to about equal to or lower than the melting point of such aromatic crystalline thermoplastic resin. According to JPA 10-29243, it is described that a highly transparent film can be prepared from the aromatic crystalline thermoplastic resin with low cost using an apparatus being compact in size. Also, JPA 10-29243 discloses an apparatus for making an inflation film wherein a guide member and the nipping rolls are integrated into a single unit that is movable upward and downward.

In the formation of an inflation film, it has been generally pointed out that where the raw resin is stiff, the resultant inflation film is susceptible to formation of slack and/or wrinkles, which makes the marketability of the film consequently low.

SUMMARY OF THE INVENTION

In view of the foregoing, the present invention has been made and is intended to provide a method for making inflation films having a smooth surface, without the formation of slack and/or wrinkles, even where a thermoplastic resin such as an engineering plastic having a relatively high stiffness, that is, a high modulus of elasticity and a low elongation at break is employed as a raw resin.

As a result of intensive studies, the present inventors have found that the outstanding problems that have been pointed out as described above can advantageously be avoided by carrying out the film manufacture according to an air quenching inflation molding and, at the same time, sufficiently lowering the temperature of the tubular film at which the tubular film solidified by cooling reaches the guide member. Based on this finding, the present inventors have completed the present invention.

More specifically, the present invention provides a method for making an inflation film by an air quenching inflation molding comprising extruding a raw resin in a molten state through a circular die to form a tubular film, expanding the tubular film by the pressure of a gaseous medium introduced into an inner space of the tubular film, while the tubular film is being cooled to be solidified by blowing a cooling gas onto the outer surface of the tubular film, and drawing the film while being progressively flattened by guide members, wherein the temperature Tf (° C.) of the solidified tubular film at the time it contacts the guide member for the first time is so adjusted as not to be higher than Tr(5) [° C.]; wherein Tr (5) represents the temperature at which a thermal deformation ratio of the solidified tubular film becomes 5% when it is measured, being loaded with a stress of a value equal to the frictional force received from the guide members under the conditions of manufacture of the film.

In order to suppress the occurrence of slack and/or wrinkles in the film formed by the inflation molding, studies have been made from various view points and various attempts have been made. For example, the following studies can be mentioned.

(1) A method in which a heat insulating cylindrical jacket is disposed between the guide members and the position at which the tubular film extruded in a molten state starts to be expanded is employed in order to prevent the temperature of the tubular film from being undesirably lowered [See the Japanese Patent Application Laid-open No. Hei. 4-53728 (JPA 4-53728)].

(2) A method in which guide plates (guide members) provided with a gas blow out port is employed in order to make the solidified tubular film extended inwardly by the gas blown from the gas blow out port on the guide plate during the drawal of the film [See the Japanese Patent Application Laid-open No. Hei. 4-7120 (JPA 4-7120)].

(3) A method in which a roller equipped with a vibration absorbing mechanism is employed in order to minimize the frictional force received from the guide members, on the tubular film and the vibrations occurring in the film during the drawal thereof [See the Japanese Patent Application Laid-open No. 2000-289106 (JPA 2000-289106)].

(4) A method in which a pair of flexible guide members having a gas permeable portion where the molten resin contacts is employed in order to wrap, cool and formulate the molten resin, extruded from the die, into a flattened film [See the Japanese Patent Application Laid-open No. 2001-162667 (JPA 2001-162667)].

It is, however, to be noted that the present invention is quite different, in terms of the principle of solution, from the known attempts previously made.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, the same reference numerals are used to specify the same parts throughout the several views, and:

DETAILED DESCRIPTION OF THE PREFERRED EMBODIMENTS

Figure 1:
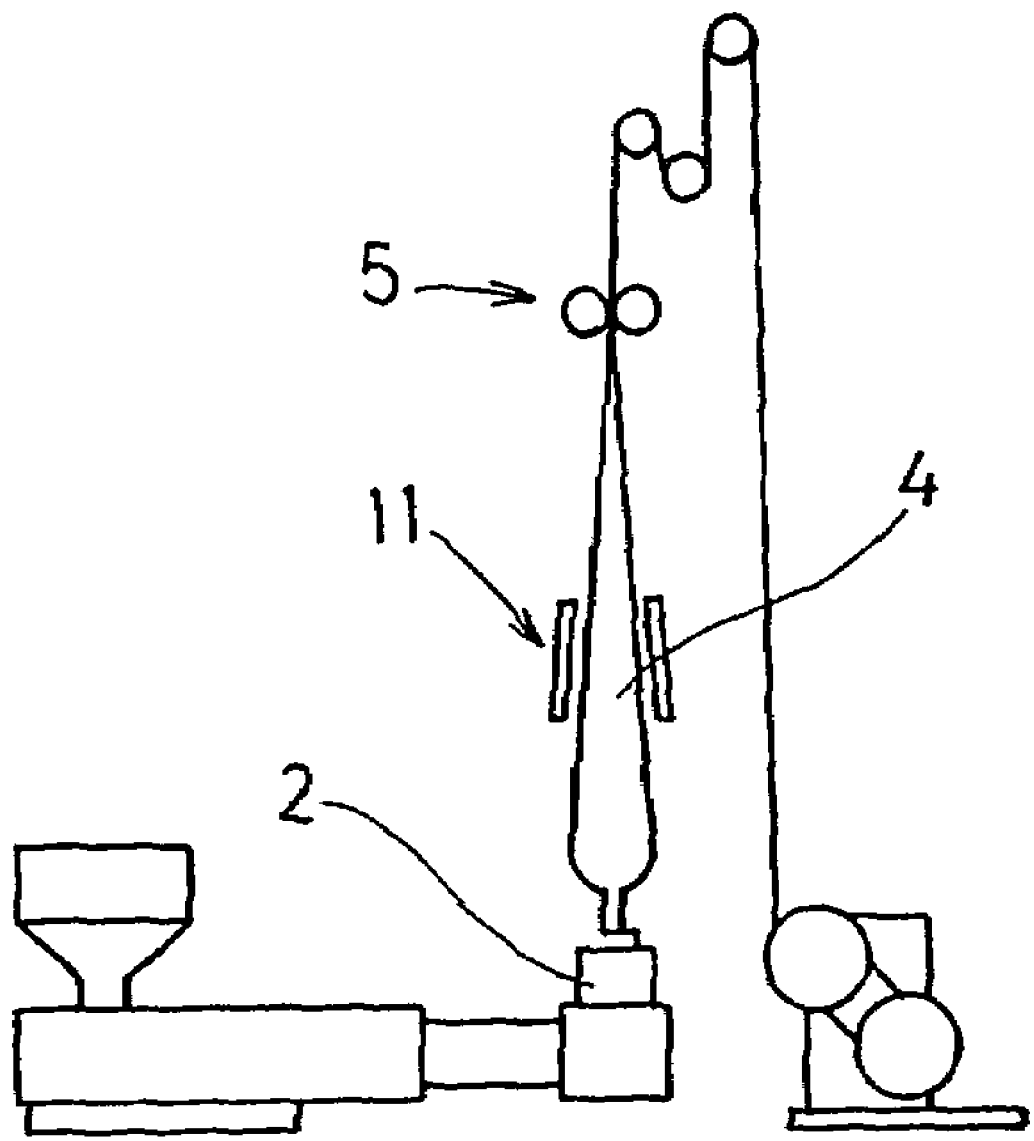
FIG. 1 is a schematic diagram showing an example of the conventional apparatus for making a film according to an inflation molding technique.

The raw resin that can be employed in the practice of the present invention includes olefinic resins such as a low density polyethylene (LDPE), a high density polyethylene (HDPE), a linear low density polyethylene (LLDPE), a polypropylene an α-olefin polymer and a copolymer of ethylene and an unsaturated ester; ethylene-vinyl alcohol copolymers; soft polyvinyl chlorides; soft polyvinylidene chlorides; polyamides; polystyrenes; polyarylates; and thermoplastic liquid crystal polymers such as a thermoplastic liquid crystal polyester.

In terms of processability and the heat resistance of the formed film, the thermoplastic liquid crystal polymer has a melting point preferably within the range of 200 to 400° C. and, more preferably, within the range of 250 to 350° C.

The method of the present invention is featured in that the temperature Tf (° C.) of the solidified tubular film at the time it contacts the guide members for the first time is adjusted not to be higher than the previously described temperature Tr (5).

According to the method of the present invention, the tubular film is sufficiently cooled at the time it contacts the guide members and, therefore, any undesirable deformation of the tubular film which would occur by the effect of a frictional force imposed thereon by the guide member is suppressed sufficiently. Accordingly, it is possible to provide a high quality film substantially free from slack and wrinkles.

During the manufacture of an inflation film, it is well known that the blocking of the film can be avoided by making the film sufficiently cooled at the time when folded by the nipping rolls. For this purpose, adjustment of the cooling speed of the molten resin extruded from the circular die has been carried out widely. However, it has not yet been thoroughly examined as to the effect of the temperature of the solidified tubular film when contacted on the guide members that operate to guide the film towards the nipping rolls. It should be again noted that the present inventors have made it clarified for the first time that adjustment of the temperature of the solidified film at the time of contact with the guide members to the predetermined temperature range mentioned above is effective to suppress the formation of the slack and wrinkles on the film.

The value of the frictional force imposed on the tubular film by the guide members varies depending on the conditions of manufacture such as the kind of the raw resin, the material constituting the guide members, surface conditions of the guide members, temperature, humidity and/or the pressure of the gaseous medium introduced into the inner space of the tubular film. In the practice of the method of the present invention, the value of the frictional force (Fd) acting, from the guide members, on the tubular film during the manufacture of the film is calculated beforehand taking such various factors described above into consideration. Then, a thermal deformation ratio of the film when loaded with a stress of a value equal to the frictional force (Fd) is measured by means of a preliminary experiment, followed by the determination of the temperature (Tr (5)) at which the thermal deformation ratio becomes 5%. Using this temperature as a reference, the temperature of the solidified tubular film is adjusted so as to fall within the predetermined temperature range.

Figure 2:
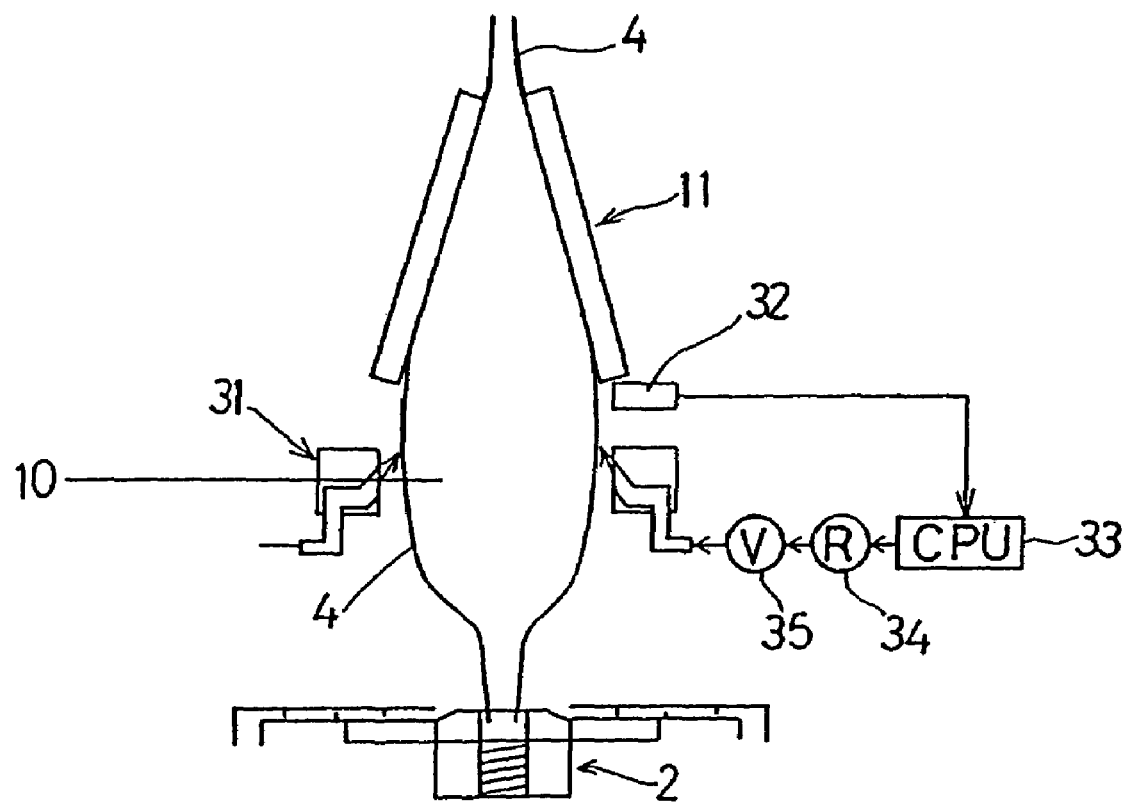
FIG. 2 is a schematic diagram showing an apparatus for making an inflation film according to a preferred embodiment of the present invention.
Figure 3:
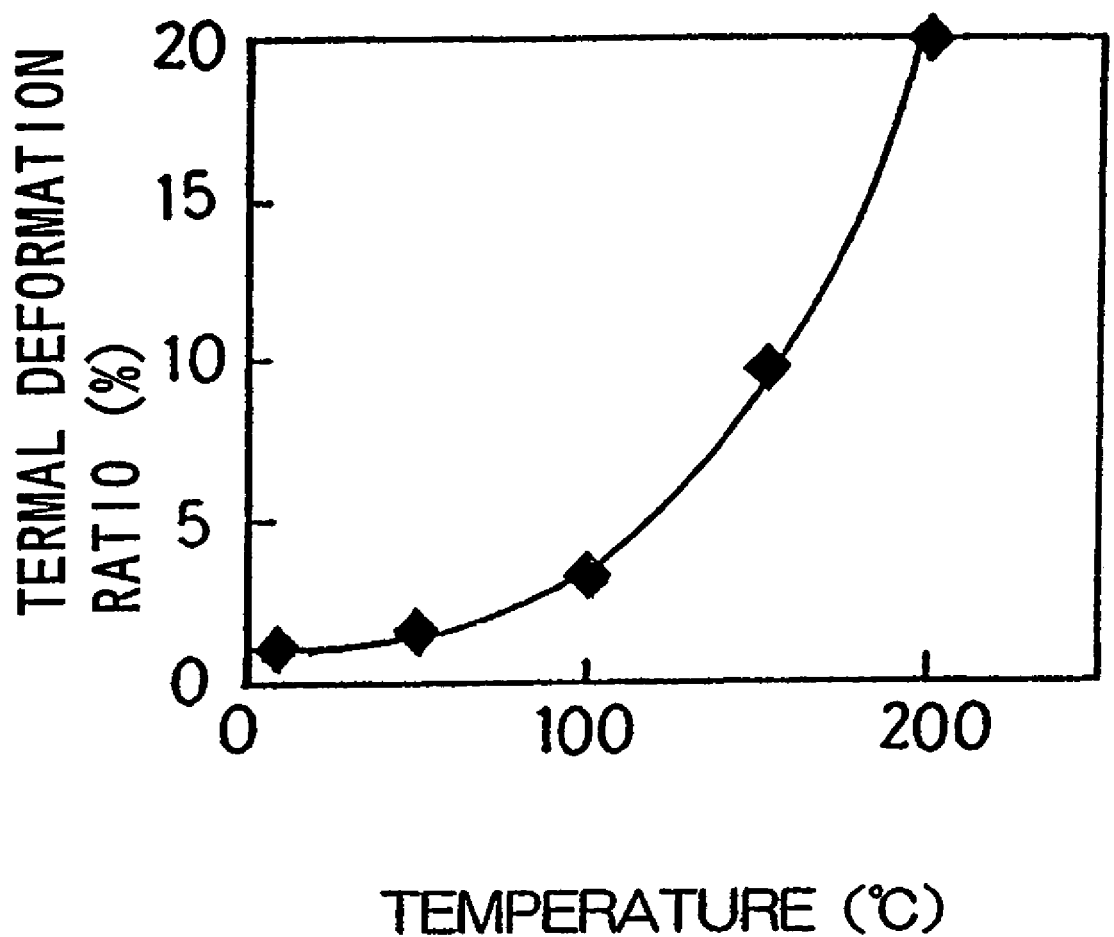
FIG. 3 is a chart showing the relationship between temperature and a thermal deformation ratio of the films obtained by the Examples 1 and 3 and Comparative Examples 1 and 2, discussed below, which is measured by a thermal mechanical analyzer.

Referring first to FIG. 2, there is schematically shown an apparatus for making an inflation film according to the present invention. In this figure, there is shown an example in which a thermoplastic liquid crystal polyester is employed as a raw resin. The raw resin in a molten state is extruded from a circular die 2 to form a tubular film 4. Although not shown, arrangement is made to introduce a gaseous medium into the inner space of the tubular film 4 in a molten state so that the tubular film in a molten state can be expanded progressively by the effect of the gaseous medium. This tubular film in a molten state is cooled by the cooling gas blown off from the cooling ring positioned immediately above the circular die and becomes solidified when it reaches a frost line 10. Thereafter, the solidified tubular film 4 is brought into contact with a pair of guide members 11 and the opposing surfaces of the tubular film 4 are made close to each other. In the illustrated embodiment, the guide members 11 have the form of flat plates so arranged in a V-shape with its top spaced. It is, however, to be noted that, instead of the flat plates, the guide members 11 may be a plurality of rolls. The guide members 11 may be made of a metal such as aluminum or stainless steel; a textile fabric made of cotton, a chemical fiber, etc; a polymer such as polytetrafluoroethylene; a pulp material such as corrugated boxes; a glassy inorganic material and so on. A composite material in which two or more of the above illustrated materials are employed, such as a plate made of a polymer and a metal, or a plastic roll around of which the textile fabric are wound, can be used as the guide members 11. Also, each of the guide members may have a smooth surface or a surface formed with fine irregularities.

Referring still to FIG. 2, an air ring 31 is disposed at a location below the guide members 11 and opposing the outer surface of the tubular film 4. This air ring 31 is operable to blow a cooling gas such as air to the outer surface of the tubular film to cool the solidified tubular film 4. Also, positioned above the air ring 31 and below the guide members 11 is a temperature sensor 32 such as an infrared temperature sensor for detecting the temperature of the solidified tubular film 4.

The temperature sensor 32 is electrically connected with an input port of a central processing unit (CPU) 33 having its output port connected with a regulator 34 and a valve 35. This CPU 33 is operable to adjust the amount of the cooling gas blown from the air ring 31 to the tubular film 4 by controlling the regulator 34 and the valve 35 so that the temperature of the solidified tubular film 4 becomes a value not higher than the previously discussed temperature Tr (5) when it contacts the guide members 11.

The manner in which the temperature of the tubular film 4 is controlled during the manufacture of the film is as follows. First of all, the previously discussed temperature Tr (5) determined by the preliminary experiment is set with the CPU 33 (step 1). Also, the temperature of the tubular film 4 at the time it contacts the guide members 11 is detected by the temperature sensor 32 and the detected temperature is read by the CPU 33 (step 2). Thereafter, the CPU 33 compares both data and determines if the temperature of the tubular film 4 is not higher than the temperature [Tr (5)] (step 3). If the temperature of the tubular film 4 is found to be higher than the predetermined temperature[Tr (5)], the amount of an air to be blown off from the air ring 31 to the tubular film 4 is increased in response to an output signal from the CPU 33 (step 4). On the other hand, if the temperature of the tubular film 4 is not higher than the predetermined temperature [Tr (5)], the process described as "step 4" is omitted and a process subsequent to the step 2 is repeated. In this way, the temperature of the tubular film 4 at the time of contact with the guide members 11 is so controlled as to be a value not higher than the predetermined temperature.

It is to be noted that although, in FIG. 2, the raw resin has been shown and described as extruded upwardly from the circular die 2 to form the tubular film 4, the present invention can be applied to the case where the raw resin is extruded downwardly or in a lateral direction from the circular die.

In addition, it is to be noted that the temperature of the tubular film 4 may be controlled as to be a value not higher than the predetermined temperature [Tr (5)] alternatively by (A) moving the guide members 11 in a direction along with the direction in which the tubular film 4 is drawn (up and down so far illustrated), (B) adjusting the temperature of the atmosphere around the tubular film 4, or (C) adjusting the temperature of the gaseous medium blown from the air ring 31.

Hereinafter, the method for making a film in accordance with the present invention will be demonstrated by way of specific examples which are not intended to limit the scope of the present invention. It is to be noted that the evaluation of the thermal deformation ratio, appearance and variation in film thickness of the film were carried out by the following manners:

(1) Thermal Deformation Ratio:

A test piece of 5 mm in width and 20 mm in length is cut from the film and tested for, using a thermal mechanical analyzer ["TMA-50", manufactured by Shimadzu Corporation], the change in length at a determined temperature, wherein the test piece is loaded, in a direction of the mechanical axis of the film, with a stress of a predetermined value equal to the frictional force that the film receives from the guide members. The thermal deformation ratio at a determined temperature is calculated based on the observed value for the change in length.

The measurement of the change in length is conducted at various temperatures. Plotting of the value for the thermal deformation ratio gives a graph representing the relation between the temperature and the thermal deformation ratio.

Based on the graph, the temperature at which the thermal deformation ratio becomes 5% is determined.

(2) Appearance:

1000 meter sample of the formed film is observed visually and evaluated as follows:

Excellent: No wrinkle was observed.

Good: 1 to 10 wrinkles were observed.

Moderate: 11 to 50 wrinkles were observed.

Not Good: 51 or more of wrinkles were observed.

(3) Variation in Film Thickness:

The formed film was cut in a direction of the mechanical axis thereof (MD) to give a sample of 4 meters in length. The film thickness of the sample is measured at twenty points at intervals of 20 cm in MD and also at twenty four points in a direction (TD) perpendicular to MD, that is, at 480 (=20×24) points in total, and the difference between the greatest film thickness and the smallest film thickness is taken as a quantity of variation in film thickness.

EXAMPLE 1

Using the apparatus of the structure shown in and described with reference to FIG. 2, inflation molding of a thermoplastic liquid crystal polyester ("VECTRA A950", manufactured by Polyplastics Co., Ltd.) was carried out under the following conditions to give a film having an average film thickness of 25 μm and an average fold width of 314 mm. The circular die 2 includes an inner element of 49.5 mm in outer diameter and an outer element of 50.0 mm of inner diameter. The amount of the molten raw resin extruded was set to 13 kg/hr; the film take-up speed at which the film was drawn was set to 9.9 m/min; and the frost line 10 was located 300 mm above the circular die 2. Also, the air ring 31 was positioned at a location of 1,000 mm above the circular die 2, and the guide members 11, both of which had a length of 2 m and were made of stainless steel plate (SUS 304), were arranged in V-shape with their lower end positioned at 2,000 mm above the circular die 2. The guide members 11 had their lower ends spaced 200 mm from each other and their upper end spaced 20 mm from each other. The temperature (Tf) of the film 4 at the time it contacted the guide members 11 for the first time was adjusted to 100° C. by controlling the amount of the air blown from the air ring 31.

The appearance and variation in film thickness of the formed film are shown in Table 1.

During the manufacture of the film, the frictional force imposed on the tubular film 4 by the guide members 11 was calculated as 0.32 N/mm.

A test piece of 20 mm in length in the MD and 5 mm in width in the TD was cut from the formed film and tested for the thermal deformation ratio under the condition in which the test piece was loaded with a stress of a value equal to the above described frictional force according to the previously described method.

The temperature [Tr (5)] at which the thermal deformation ratio becomes 5% was 120° C.

COMPARATIVE EXAMPLE 1

The procedures of Example 1 were repeated, except that no air ring 31 was employed, to give an inflation film having an average film thickness of 25 μm and an average fold width of 314 mm. In this Comparative Example, the temperature of the tubular film 4 at the time it contacted the guide members 11 for the first time was 160° C. and that at the time it arrived at the upper ends of the guide members 11 was 140° C.

The appearance and variation in film thickness of the formed film are as shown in Table 1.

During the manufacture of the film, the frictional force imposed on the tubular film 4 by the guide members 11 was calculated as 0.32 N/mm.

A test piece of 20 mm in length in the MD and 5 mm in width in the TD was cut from the formed film and tested for the thermal deformation ratio under the condition in which the test piece was loaded with a stress of a value equal to the above described frictional force according to the previously described method.

The temperature [Tr (5)] at which the thermal deformation ratio becomes 5% was 120° C.

COMPARATIVE EXAMPLE 2

The procedures of Example 1 were repeated, except that the amount of air blown from the air ring 31 was controlled to adjust the temperature of the film to be 130° C. when it contacted the guide members 11 for the first time, to give an inflation film having an average film thickness of 25 μm and an average folding width of 314 mm. In this Comparative Example, the temperature of the tubular film at the time it arrived at the upper ends of the guide members 11 was 110° C.

The appearance and variation in film thickness of the formed film are as shown in Table 1 below.

During the manufacture of the film, the frictional force exerted by the guide members 11 on the tubular film 4 was calculated as 0.32 N/mm.

Using a test piece of 20 mm in length in the MD and 5 mm in width in the TD was cut from the formed film and tested for the thermal deformation ratio under the condition in which the test piece was loaded with a stress of a value equal to the above described frictional force according to the previously described method.

The temperature [Tr (5)] at which the thermal deformation ratio becomes 5% was 120° C.

TABLE 1

| | Evaluation of the Formed Film | |
|---|---|---|
| | Appearance | Variation in Film Thickness |
| Example 1 | Excellent | 5 μm |
| Comp. Ex. 1 | No Good | 10 μm |
| Comp. Ex. 2 | Moderate | 6 μm |

EXAMPLE 2

Using the apparatus of the structure shown in and described with reference to FIG. 2, inflation molding of a thermoplastic liquid crystal polyester ("VECTRA C950", manufactured by Polyplastics Co., Ltd.) was carried out under the following conditions to give a film having an average film thickness of 50 μm and an average fold width of 314 mm. The circular die 2 used includes an inner element of 39.0 mm in outer diameter and an outer element of 40.0 mm of inner diameter. The amount of the molten raw resin extruded was set to 26 kg/hr; the film take-up speed was set to 10 m/min; and the frost line 10 was located 350 mm apart from or above the circular die 2. Also, the air ring 31 was positioned at a location of 1,000 mm apart from the circular die 2, and the guide members 11, both of which had a length of 2 m and were made of stainless steel plate (SUS 304), were arranged in V-shape with their lower end positioned 2,000 mm apart from the circular die 2. The guide members 11 had their lower ends spaced 200 mm from each other and their upper end spaced 20 mm from each other. The temperature (Tf) of the film 4 at the time it contacted the guide members 11 for the first time was adjusted to 120° C. by controlling the amount of air blown off from the air ring 31.

The appearance and variation in film thickness of the formed film are as shown in Table 2.

During the manufacture of the film, the frictional force imposed on the tubular film 4 by the guide members 11 was calculated as 0.3 N/mm.

A test piece of 20 mm in length in the MD and 5 mm in width in the TD was cut from the formed film and tested for the thermal deformation ratio under the condition in which the test piece was loaded with a stress of a value equal to the above described frictional force according to the previously described method.

The temperature [Tr (5)] at which the thermal deformation ratio becomes 5% was 140° C.

EXAMPLE 3

The procedures of Example 1 were repeated, except that the guide members 11, both of which had a length of 2 m and were made of stainless steel plate (SUS 304) coated with a glass fiber reinforced Teflon® sheet (FGF-500-4, manufactured by Chukoh Kasei Kogyo Kabushiki Kaisha) were employed and the temperature (TF) of the film 4 at the time it contacted the guide members 11 for the first time was adjusted to 130° C. by controlling the amount of air blown off from the air ring 31, to give an inflation film having an average film thickness of 25 μm and an average fold width of 314 mm.

The appearance and variation in film thickness of the formed film are as shown in Table 2.

During the manufacture of the film, the frictional force imposed on the tubular film 4 by the guide members 11 was calculated as 0.15 N/mm.

A test piece of 20 mm in length in the MD and 5 mm in width in the TD was cut from the formed film and tested for the thermal deformation ratio under the condition in which the test piece was loaded with a stress of a value equal to the above described frictional force according to the previously described method.

The temperature [Tr (5)] at which the thermal deformation ratio becomes 5% was 145° C.

TABLE 2

| | Evaluation of the Formed Film | |
|---|---|---|
| | Appearance | Variation in Film Thickness |
| Example 2 | Excellent | 6 μm |
| Example 3 | Good | 5 μm |

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method for making an inflation film by an air quenching inflation molding comprising:

extruding a raw resin in a molten state through a circular die to form a tubular film, expanding said tubular film by the pressure of a gaseous medium introduced into an inner space of the tubular film, while the tubular film is being cooled to be solidified by blowing a cooling gas to the outer surface of the tubular film from a cooling ring disposed at a location between the circular die and guide members and opposing the outer surface of the tubular film, and drawing the film while being progressively flattened by guide members, wherein the temperature Tf (° C.) of the solidified tubular film at the time it contacts the guide member for the first time is measured by a temperature sensor and the measured temperature Tf(° C.) is so adjusted as not to be higher than Tr (5);

wherein Tr (5) represents the temperature at which a thermal deformation ratio of the solidified tubular film becomes 5% when it is measured, being loaded with a stress of a value equal to the frictional force received from the guide members under the conditions of manufacture of the film.

2. The method as claimed in claim 1, which comprises extruding the raw resin in a molten state is extruded from the circular die in a direction upwardly thereof.

3. The method as claimed in claim 1, which comprises positioning the temperature sensor between the air ring and the guide members.

4. The method as claimed in claim 1 which comprises adjusting the temperature Tf(° C.) by changing the amount and/or the temperature of air blown from the air ring.

5. The method as claimed in claim 1, which comprises adjusting the temperature Tf(° C.) by moving the guide members in a direction along with the direction in which the tubular film is drawn.

6. The method as claimed in claim 1, which comprises adjusting the temperature Tf(° C.) by changing the temperature of the atmosphere around the tubular film.

* * * * *